United States Patent [19]
Weuster et al.

[11] Patent Number: 5,617,620
[45] Date of Patent: Apr. 8, 1997

[54] SNAP RING APPLICATOR

[75] Inventors: Ralph E. Weuster; Otis A. Hite, both of Stillwater, Okla.

[73] Assignee: Brunswick Corporation, Lake Forest, Ill.

[21] Appl. No.: 621,992

[22] Filed: Mar. 26, 1996

[51] Int. Cl.⁶ .................................................. B23D 19/04
[52] U.S. Cl. .............................. 29/229; 29/252; 29/253
[58] Field of Search ........................... 29/229, 225, 239, 29/252, 253; 81/301, 302, 443, 444; 72/453.03, 453.16, 453.14; 294/95, 97

[56] References Cited

U.S. PATENT DOCUMENTS

| | | | |
|---|---|---|---|
| 3,819,153 | 6/1974 | Hurst et al. | 29/252 |
| 4,351,097 | 9/1982 | Hashimoto et al. | 29/229 |
| 4,862,572 | 9/1989 | Jeromson et al. | 29/229 |
| 5,125,296 | 6/1992 | Nelson et al. | 29/229 |
| 5,327,802 | 7/1994 | Yu . | |
| 5,483,732 | 1/1996 | Wang . | |

Primary Examiner—Robert C. Watson
Attorney, Agent, or Firm—Andrus, Sceales, Starke & Sawall

[57] ABSTRACT

A snap ring applicator having a pair of scissor arms connected to a pivot element. The snap ring applicator includes a linear activating device connected to a driving element. The driving element contacts the angled activating surface contained on the rear end of the scissor arms. The linear movement of the driving element forces the rear end of the scissor arms together which causes the scissor arms to pivot about a pivot element and thereby separates the front ends of the scissor arms. Contained in each front end of the scissor arms is a snap ring pin, which is sized to engage a snap ring. When the snap ring applicator is activated to move the front ends of the scissor arms apart, the snap ring pins act to expand the inner diameter of the snap ring. When expanded as such, the snap ring can then be passed over the pipe or shaft to which it is to be applied. The snap ring applicator is then deactivated, which returns the snap ring to its original size, thereby securely positioning the snap ring as desired.

22 Claims, 2 Drawing Sheets

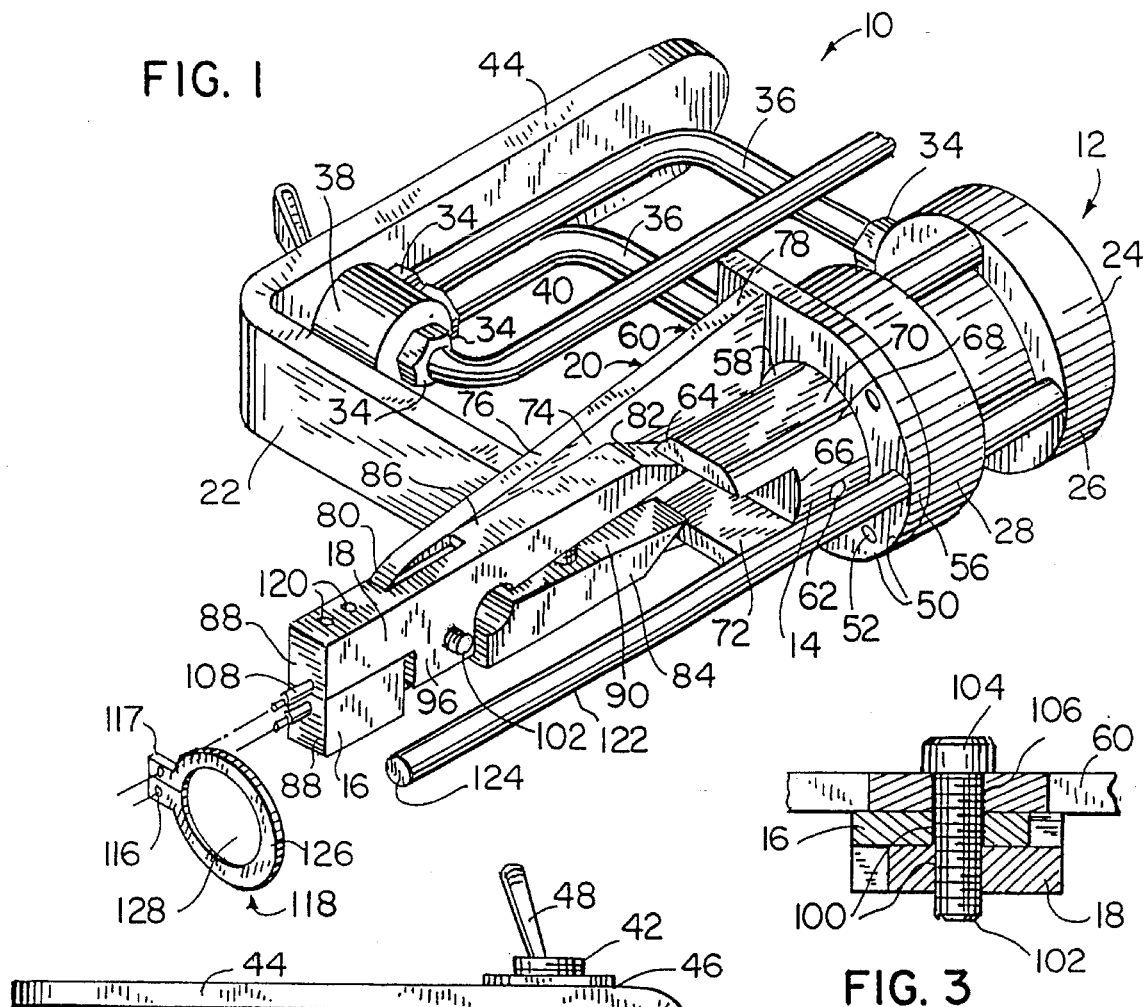
FIG. 1
FIG. 3
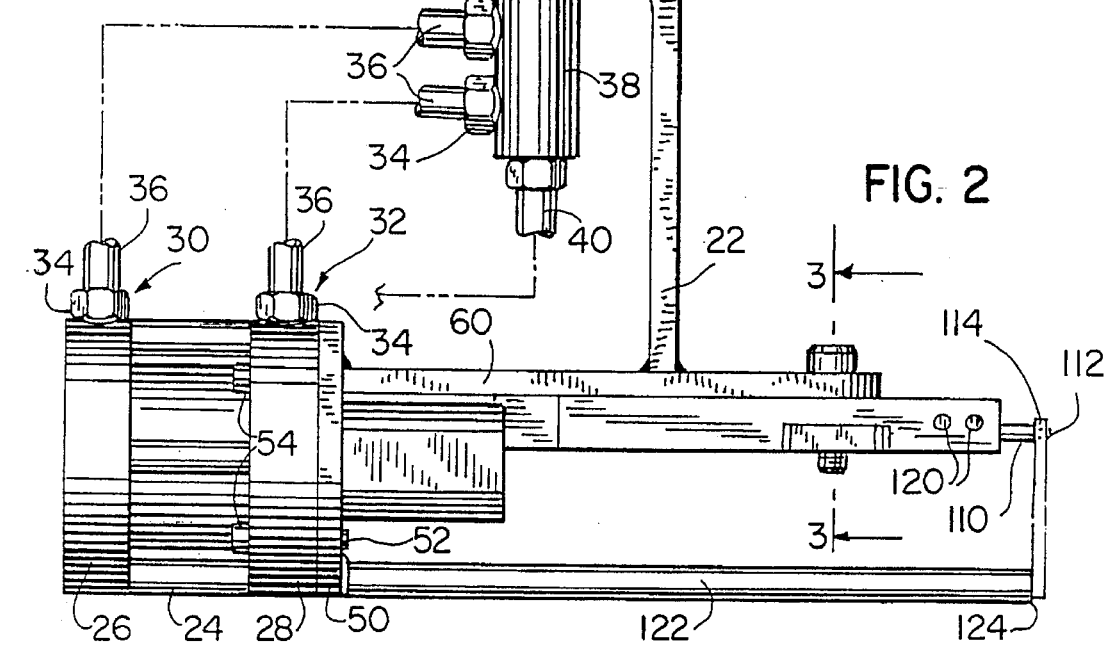
FIG. 2

SNAP RING APPLICATOR

FIELD OF THE INVENTION

The invention relates to the application of snap rings to elongated cylindrical housings or pipes, such as marine propeller shafts and drive shafts. More specifically, the invention relates to an externally powered snap ring applicator.

BACKGROUND OF THE INVENTION

In many marine propulsion applications, a snap ring is used to securely position and mount items, such as bushings, to a shaft or pipe. In practice, the otherwise smooth shaft or pipe typically includes a shallow groove to help retain the snap ring in the desired position. Snap rings are pre-formed circular pieces of metal having an inner diameter slightly smaller than the external diameter of the pipe or shaft to which they are applied. The snap rings typically contain a small break or open section in the ring. To apply the snap ring, the ring is flexed outward to increase its circumference so that it can be slipped over the end of the pipe or shaft and positioned accordingly. Once the snap ring is in place, the external force is removed from the snap ring, causing it to return to its original size and securely hold it in place on the shaft.

In the past, hand operated devices have been used to provide the force needed to expand the snap ring. Typically, a snap ring pliers is used by workers on an assembly line to expand and apply the snap rings. The snap ring pliers require the worker to exert a contracting force on the handles of the pliers, which in turn expands the snap ring. In a production assembly line, a worker might use a pliers in this manner as many as 500 times daily. This task is both labor intensive and tedious.

Therefore, it can be appreciated that an externally powered snap ring applicator would be desirable, especially for applying snap rings on marine propeller and drive shafts.

SUMMARY OF THE INVENTION

The invention is a powered snap ring applicator that can be used to efficiently apply snap rings to marine propellers and drive shafts for marine engine assembly.

The snap ring applicator includes a pair of scissor arms each having a pivot connecting portion and a front and a rear end. The snap ring applicator also includes a pivot element that passes through the pivot connecting portion of each scissor arm. The pivot element also passes through a lower mounting frame and securely attaches both of the scissor arms to a mounting frame, while allowing the scissor arms to pivot about the pivot element. The mounting frame of the snap ring applicator is comprised of a horizontal mounting plate and an orthogonally connected power source mounting plate.

The rear end of the scissor arms contains an angled activating surface. A snap ring pin is mounted to the front end of each scissor arm. Connected to the power source mounting plate of the mounting frame is a linear activating device, such as an air powered cylinder. Securely connected to the rod of the air powered cylinder is a driving element. The driving element includes a pair of contact legs which rest against the angled activating surface of the scissor arms.

When a user wishes to install a snap ring, the user puts the snap ring pins on the scissor arms of the applicator into the snap ring holes. The user then activates the linear power source, which in turn moves the driving element forward. The forward movement causes the contact legs on the driving element to move along the angled activating surface on the rear ends of the scissor arms, thus forcing the rear ends together. This causes each scissor arm to pivot about its pivot connecting portion and move the front ends of the scissor arms apart. This separation of the front ends of the scissor arms causes the snap ring pins to separate, thereby expanding the snap ring. In this manner, a snap ring can be expanded with little or no physical force being applied by the operator.

In an alternate embodiment of the invention, the contact legs of the driving element are angled inward, while the rear end of each scissor arm is straight.

In addition, the snap ring applicator is provided with a guide rod that is used to support the lower surface of a snap ring when the snap ring is applied to a shaft or a pipe. This guide rod is securely fixed to the mounting frame and extends out to a second end that is the same plane as the shoulder portion of the nap ring pins.

The snap ring applicator can also include a handle that is connected to the horizontal mounting plate and is used by the operator to effectively position the snap ring applicator.

Other objects and advantages will appear in the course of the following description.

BRIEF DESCRIPTION OF THE DRAWINGS

FIG. 1 is an isometric view of a snap ring applicator in accordance with the invention;

FIG. 2 is a side plan view of the snap ring applicator shown in FIG. 1;

FIG. 3 is a sectional view taken along line 3—3 of FIG. 2;

DETAILED DESCRIPTION OF THE DRAWINGS

Figure 4:
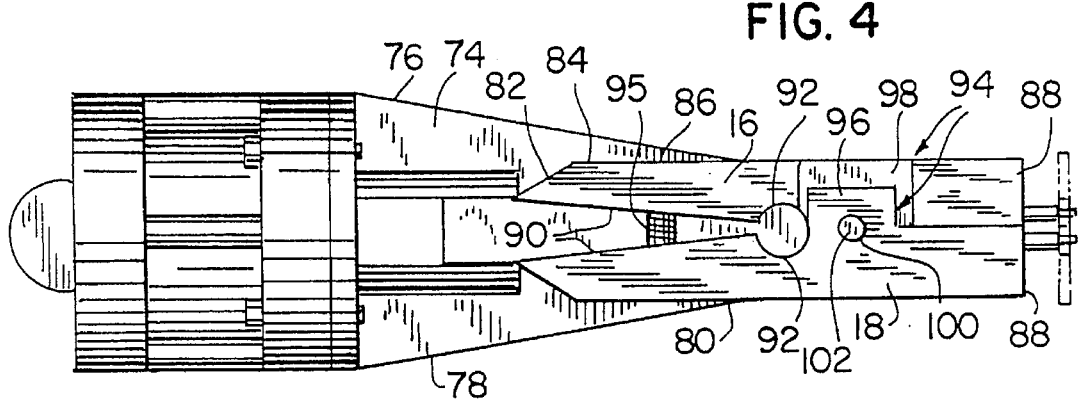
FIG. 4 is a top plan view of the snap ring applicator of the invention with the scissor arms in a closed position.

Referring to the drawings, the invention is a snap ring applicator generally designated by the reference numeral 10. The snap ring applicator 10 generally consists of a power source 12, a driving element 14, a pair of scissor arms 16 and 18, a mounting frame 20 and a handle 22.

The power source 12 is preferably an air cylinder 24 powered in both the forward and the reverse directions. The air cylinder 24 has a pair of operating compartments 26 and 28, each of which has its own air source input 30 and 32. The air source inputs 30,32 each consists of an attachment nut 34 that secures one end of an air supply hose 36 to the operating compartments 26,28 of air cylinder 24. Each of the air supply hoses 36 are connected at a second end to an actuating switch housing 38 on the handle 22 by a second pair of attachment nuts 34. A third air supply hose 40 is also connected to the actuator switch housing 38 by an attachment nut 34. The air supply hose 40, as can best be seen in FIG. 1, extends from the actuator switch housing 38 to a source of compressed air (not shown). While an air cylinder is the preferred power source 12, other suitable sources of driving power, such as an electric motor or hydraulic cylinder could be used while still operating under the scope of the invention.

The actuator switch housing 38 has a threaded attachment portion 42 that extends through a hole in a lower portion 44 of the handle 22. The attachment portion 42 has a smaller diameter than the switch housing 38. This allows the attachment portion 42 to pass through the hole in the lower portion 44 of the handle, while preventing the larger attachment switch housing 38 from passing through the hole. A threaded washer 46 is applied to the attachment portion 42 extending through the handle to securely hold the actuator switch housing 38 to the handle 22.

An actuator switch 48 extends from the attachment portion 42 of the switch housing 38. The actuator switch 48 is used to selectively supply compressed air to one of the operating compartments 26,28 of the air cylinder 24, thereby powering the air cylinder 24 in either a forward or reverse direction. As shown in FIGS. 1 and 2, with the actuator switch 48 in the back position, the air cylinder 24 is powered in the reverse direction.

The power source 12 is mounted to a vertical power source mounting plate 50 by a plurality of connectors 52. Each of the connectors 52 includes an expanded head portion 54 that is sized to prevent passage through an associated cylindrical bore in the operating compartment 28. As can best be seen in FIG. 1, the power source mounting plate 50 has an arcuate upper edge 56 that corresponds to the curved surface of the operating compartment 28 of the air cylinder 24. The power source mounting plate also has a circular operating opening 58 contained in the center of the power source mounting plate 50. The lower portion of the power source mounting plate 50 is securely connected at a right angle to a horizontal scissor arm mounting plate 60 at a location above the lower edge of the power source mounting plate 50.

Air cylinder 24 includes a cylinder rod 25 (FIG. 6) that extends through the operating opening 58 in the mounting plate 50. The cylinder rod 25 is securely attached to the driving element 14. The driving element 14 is connected to the cylinder rod 25 by a set screw 62, FIG. 1. As can best be seen in FIG. 1, the driving element 14 is a generally cylindrical element having a rough diameter slightly less than the operating opening 58 contained in the power source mounting plate 50. The driving element 14 has a pair of contact legs 64, a main body portion 68 and an interior stop surface 66. The driving element 14 further includes a pair of planar exterior side surfaces 70 and a pair of planar interior contact legs surfaces 72 on each contact leg 64.

Driving element 14 is positioned to travel along the scissor arm mounting plate 60 in a linear path. The scissor arm mounting plate 60 has a planar top surface 74 and a pair of angled side edges 76 which taper the top surface 74 from a wider rear end 78 to a narrower front end 80. The angled side edges 76 result in the scissor arm mounting plate 60 being of a generally trapezoidal shape, as can best be seen in FIG. 4.

The contact legs 64 of the driving element 14 interact with each of the scissor arms 16 and 18 by pressing against an angled activating surface 82 on the rear end 84 of each scissor arm 16, 18. Each of the scissor arms 16,18 has a generally planar exterior side surface 86 extending from the angled activating surface 82 to the front end 88 of each scissor arm 16,18. Further, each scissor arm has a generally planar interior surface 90 extending from the rear end of the angled activating surface 82 to a semi-circular removed portion 92 of each scissor arm.

As can best be seen in FIG. 4, a spring 95 is positioned between the interior surfaces 90 of each scissor arm 16,18 to provide a bias force that holds the front ends 88 of the scissor arms 16,18 in contact with each other. Each of the scissor arms 16 and 18 has a pivot connecting portion 94 located between the rear end 84 and the front end 88 of each scissor arm 16,18. The scissor arm 18 has a pivot connecting portion 94 consisting of an extending tab 96. The pivot connecting portion 94 of scissor arm 16 consists of a depressed section 98. The extending tab 96 of scissor arm 18 extends over the depressed section 98 of scissor arm 16. Both the tab 96 of the scissor arm 18 and the depressed portion 98 of the scissor arm 16 contain a pivot hole 100 through which a pivot element 102 passes. The pivot element 102 provides a rotatable point of connection between the scissor arm mounting plate 60 and each of the scissor arms 16,18o As can best be seen in FIG. 4, the tab 96 of scissor arm 18 does not extend to the exterior side edge of scissor pivot arm 16.

FIG. 3 shows a detailed sectional view of the pivot element 102 and the interaction of the pivot element 102 with the pivot connecting portion 94 of each scissor arm 16,18 and the scissor arm mounting plate 60. The pivot element 102 has a head portion 104 that is sized larger than the mounting hole 106 contained in the scissor arm mounting plate 60 to prevent the pivot element 102 from freely passing through the mounting plate 60. The pivot hole 100 contained in the depressed portion 98 of scissor arm 16 is sized slightly larger than the diameter of the pivot element 102. This allows the pivot element 102 to freely pass through the pivot hole 100 in scissor arm 16. The pivot hole 100 contained in the tab 96 of scissor arm 18 is threaded to threadedly interact with the pivot element 102. In this manner, the head 104 of the pivot element and the threaded connection between the pivot hole 100 of the scissor arm 18 and the pivot element 102 provide a secure means of attachment between the pair of scissor arms 16,18 and the scissor arms mounting plate 60, while still allowing each of the scissor arms 16,18 to rotate independently about the point of connection.

The front end 88 of each scissor arm 16,18 includes a cylindrical bore sized to receive a snap ring pin 108. As can best be seen in FIG. 2, each snap ring pin 108 has an attachment portion 110 and a reduced diameter inserting portion 112 which meet at a shoulder 114. As can further be seen in FIG. 1, the inserting portion 112 passes through the holes 116 contained in the snap ring 118. The shoulder 114 is sized such that it does not pass through the holes 116 in the snap ring 118 so that during operation the snap ring holes 116 rest upon the shoulder 114 of the snap ring pins 108.

The snap ring pins 108 are securely held in the cylindrical bores in the front end 88 of each scissor arm 16,18 by a pair of set screws 120. The set screws 120 pass through a threaded bore in the exterior side surface 86 of each scissor arm to contact the snap ring pins 108 and securely hold them in place. In operation, the snap ring pins 108 can be removed from the front end 88 of the scissor arms 16,18 and different snap ring pins 108 can be inserted into the scissor arms 16,18 to correspond to snap rings 118 of different sizes. The snap ring applicator can therefore be used in connection with a variety of snap rings 118 having various holes 116 in the extended tab portion 117 of the snap ring. The set screws 120 also allow the snap rings pins 108 to be replaced if they become damaged during use of the snap ring applicator 10.

A guide rod 122 is connected to the power source mounting plate 50 at a location between the upper edge 56 of the plate 50 and the top of the operating opening 58 through the plate 50. Specifically, the location is along a center line bisecting the width of the power source mounting plate 50. The guide rod 122 extends from the power source mounting plate 50 to its operating end position 124 which is in the same vertical plane as the shoulder 114 of each snap ring pin 108. Guide rod 122 is preferably a cylindrical rod having an adequate diameter to provide secure support for the flat face surface 126 of the snap ring 118. As shown in FIGS. 1 and 2, when the snap ring is positioned over the snap ring pins 108, the face surface 126 of the snap ring is in contact with the operating end 124 of the guide rod 122. The guide rod 122 supports the face surface 126 of the snap ring 118 when a pipe or shaft is inserted through the interior opening 128 of the snap ring 118.

Figure 5:
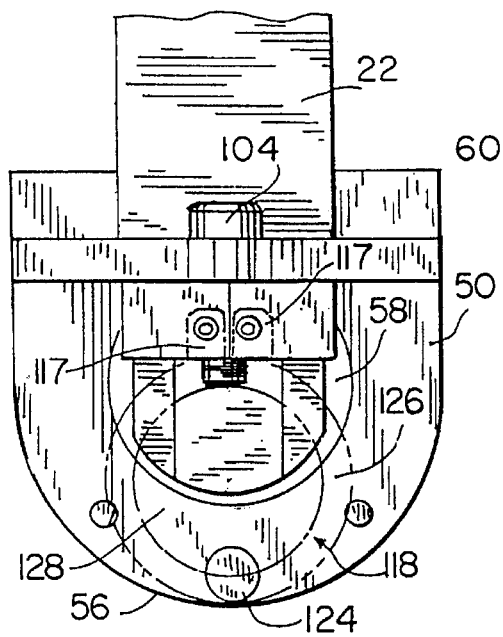
FIG. 5 is a partial front view of the snap ring applicator of the invention with the scissor arms in a closed position.
Figure 7:
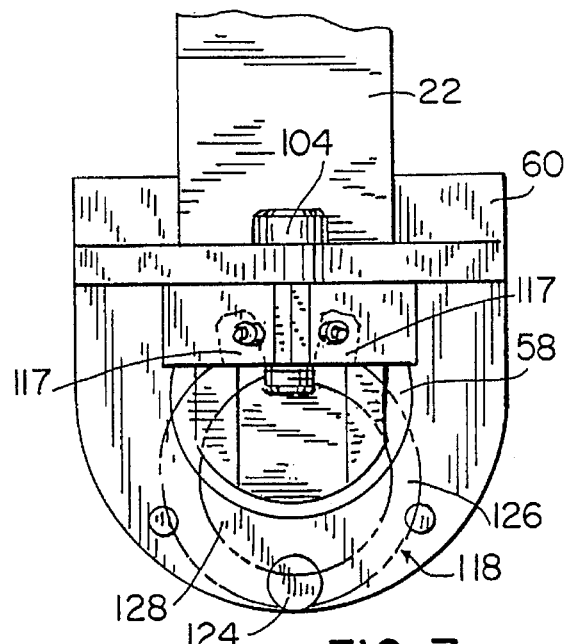
FIG. 7 is a partial front view of the snap ring applicator with the scissor arms in an open position.

The operation of the snap ring applicator will now be described. The user first places the snap ring 118 in position such that the inserting portion 112 of each snap ring pin 108 passes through the holes 116 contained in the tab portion 117 of the snap ring 118. With the snap ring 118 in place on the snap ring pins 108, the face surface 126 of the snap ring 118 located opposite the tab portion 117 contacts the operating end 124 of the guide rod 122. Initially, the scissor arms 18,16 are in a closed position that the front ends 88 of each scissor arm are positioned adjacent to one another, as shown in FIG. 4. At this time, the actuator switch 48 is in the back position and the air cylinder 24 is powered in the reverse direction. As can be seen in FIG. 5, the snap ring 118 has an interior opening 128 of a specific diameter.

To actuate the snap ring applicator 10, the user moves the actuator switch 48 from the back position to a front position, which causes pressurized air to be applied to the rear operating compartment 26 of the air cylinder 24. The supplied air pressure then causes the air cylinder 24 to move the driving element 14 in a forward direction along a linear path. The forward movement of the driving element 14 causes an interior contact surface 130 on each contact leg 64 to push against the angled activating surface 82 of each scissor arm 16,18. The linear forward movement of the driving element 14 against the angled activating surfaces 82 causes the scissor arms 16,18 to pivot about the pivot element 102. This causes the front ends 88 of scissors arms 16,18 to move apart. This interaction between the movement of the driving element 14 and the front end 88 of the scissor arms 16,18 can best be seen in FIGS. 4–6.

Figure 6:
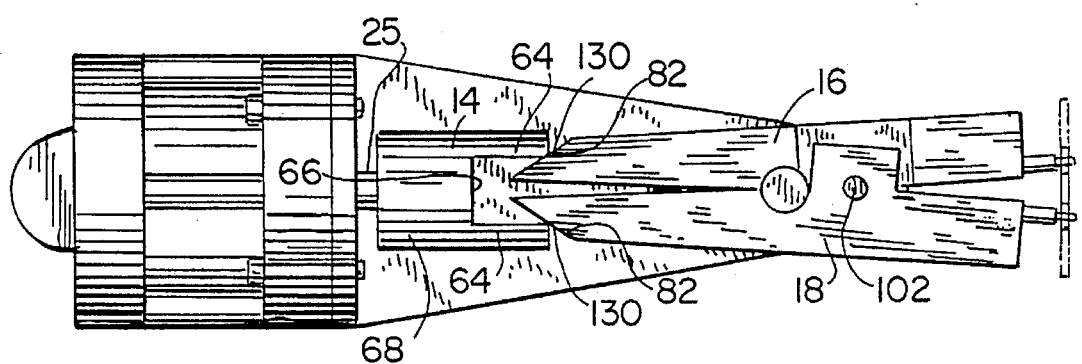
FIG. 6 is a top plan view of the snap ring applicator of the invention with the scissor arms in an open position.

When the driving element 14 is in the forward position, FIG. 6, and the front ends 88 of each scissor arm 16,18 are in an open position, the snap ring pins 108 force the tab portions 117 of the snap ring 118 apart, which expands the interior opening 128 of the snap ring 118. Once the interior opening 128 is expanded, the pipe or shaft on which the snap ring 118 is to be applied can be inserted through the expanded interior opening 128. As shown in FIGS. 1 and 2, when a pipe is inserted through the expanded interior opening 128, the face surface 126 of the snap ring 118 contacts the operating end 124 of the guide rod 122 to support the end of the snap ring opposite the tab portions 117. In this manner, the operating end 124 of the guide rod 122 supports the snap ring 118 in a generally planar surface to prevent the snap ring 118 from tilting during application to a shaft or pipe.

Once the snap ring 118 is inserted onto the pipe or shaft, the actuator switch 48 is moved from the front to the back position. This causes pressurized air to be supplied to the front operating compartment 28 which drives the driving element 14 in a reverse direction to a position shown in FIG. 4. Along with the powered reverse movement of the driving element 14, the spring 95 mounted between the interior surface 90 of each scissor arm aids in forcing the rear ends of each scissor arm 16,18 apart. The spring 95 is biased such that during normal operation, the spring 95 provides a constant force which acts to separate the rear ends 84 of each scissor arm 16,18.

As shown in FIGS. 4 and 6, the contact surface 130 of each contact leg 64 is preferably radiused to provide a smooth point of contact with the angled activating surface 82 of each scissor arm 16,18. In the preferred embodiment of the invention, both the radiused contact surface 130 and the angled activating surface 82 of each scissor arm 16,18 are hardened to provide increased durability during continued operation of the snap ring applicator.

It is thought that the present invention and its advantages will be understood from the foregoing description and it will be apparent that various changes may be made thereto without departing from the spirit and scope of the invention and sacrificing all of its material advantages. The form hereinbefore described being merely a preferred or exemplary embodiment thereof.

We claim:

1. A snap ring applicator, comprising:

a mounting frame member;

a pair of scissor arms pivotally mounted to the mounting frame member, each scissor arm having a front and a rear end and a pivot connecting portion located between the front and rear ends, the rear end having an angled activating surface;

a snap ring pin mounted to the front end of each scissor arm;

a pivot element passing through the pivot connecting portion in each scissor arm, said pivot element pivotally securing the scissor arms to the mounting frame member so that the front end of each scissor arm can move from a closed position to an open position;

a driving element movable in a forward direction and a reverse direction along a linear path, the driving element contacting the angled activating surface on the rear end of the scissor arms; and a power source that can be activated to move the driving element in the forward direction along the linear path against the angled activating surface of each scissor arm to push the rear ends of the scissor arms together and move the front ends of the scissor arms from the closed position to the open position.

2. The snap ring applicator of claim 1, wherein the liner power source is an air actuated cylinder.

3. The snap ring applicator of claim 1, wherein the linear power source is mounted to the mounting frame member rearward of the pivot element.

4. The snap ring applicator of claim 1, wherein the snap ring pins are removably mounted to the front ends of the scissor arms.

5. The snap ring applicator of claim 4, wherein each of the scissor arms contains securing means to securely hold the snap ring pins in the front end of the scissor arm.

6. The snap ring applicator of claim 1, further comprising a handle securely connected to the mounting frame member.

7. The snap ring applicator of claim 1, wherein the mounting frame member consists of a scissor arm mounting plate and an orthogonally connected power source mounting plate.

8. The snap ring applicator of claim 7, further comprising a snap ring guide rod, the guide rod having a first end connected to the power source mounting plate and a second end positioned to contact the snap ring.

9. The snap ring applicator of claim 1, wherein the pivot element is a shoulder bolt passing through one of the scissor arms and threadedly attached to a second of the scissor arms.

10. The snap ring applicator of claim 1, wherein the driving element includes a pair of spaced contact legs in direct contact with the activating surfaces of said scissor arms.

11. The snap ring applicator of claim 10, wherein the forward movement of the driving element moves the contact legs along the activating surface of the scissor arms causing the scissor arms to pivot about the pivot element and move the front ends of the scissor arms from a closed to an open position.

12. The snap ring applicator of claim 10, wherein the contact legs and the angled activating surfaces of the scissor arms have a hardened metallic surface.

13. The snap ring applicator of claim 10, wherein the contact legs have a radiused surface that contact with the activating surfaces of the scissor arms.

14. The snap ring applicator of claim 1, wherein the snap ring pins are sized to engage the holes in the snap ring.

15. The snap ring applicator of claim 1, wherein the angled activating surfaces of said scissor arms are angled between 10°–30° C.

16. A snap ring applicator comprising:

a mounting frame member having a horizontal scissor arm mounting plate and a vertical power source mounting plate;

a pair of scissors arms pivotally mounted to the mounting frame member, each scissor arm having a front and a rear end and a pivot connecting portion located between the front and rear ends, the rear end having an angled activating surface and the front ends being movable between an open position to a closed position;

a snap ring pin mounted to the front end of each scissor arm;

a pivot element passing through the pivot connecting portion in each of the scissor arms, a pivot element pivotally securing the scissor arms to the mounting frame member so that the rear ends of the scissor arms can move from an open position to a closed position;

a driving element movable in a forward direction and a reverse direction along a linear path, the driving element having a pair of contact legs for contacting the angled activating surface of the scissor arms; and a power source mounted to the power source mounting plate that can be activated to move the driving element in the forward direction along the linear path against the angled activating surface of the scissor arms to push the rear ends of the scissor arms together and move the front ends of the scissor arms from the closed position to the open position.

17. The snap ring applicator of claim 16, further comprising a handle securely connected to the mounting frame member.

18. The snap ring applicator of claim 16, wherein the linear power source is an air actuated cylinder.

19. The snap ring applicator of claim 16, further comprising a return spring positioned between the scissor arms, the return spring biased to hold the front ends of the scissor arms in a closed position.

20. The snap ring applicator of claim 16, further comprising a snap ring guide rod having a first end connected to the power source mounting plate and a second end positioned to contact the snap ring.

21. The snap ring applicator of claim 18, wherein the linear power source is bidirectionally powered.

22. A snap ring applicator, comprising:

a mounting frame member;

a pair of scissor arms pivotally mounted to the mounting frame member, each scissor arm having a front and a rear end and a pivot connecting portion located between the front and rear ends;

a snap ring pin mounted to the front end of each scissor arm;

a pivot element passing through the pivot connecting portion in each of the scissor arms, the pivot element pivotally securing the scissor arms to the mounting frame member so that the front ends of the scissor arms can move from a closed position to an open position;

a driving element having a pair of angled contact legs movable in a forward direction and a reverse direction along a linear path, the angled contact legs contacting the rear ends of the scissor arms; and a power source that can be activated to move the driving element in the forward direction along the linear path against the rear ends of the scissor arms to push the rear ends of the scissor arms together and move the front ends of the scissor arms from the closed position to the open position.

* * * * *